United States Patent [19]

Chan et al.

[11] Patent Number: 5,388,219
[45] Date of Patent: Feb. 7, 1995

[54] EFFICIENT CHANNEL AND CONTROL UNIT FOR HOST COMPUTER

[75] Inventors: Shek-Wayne Chan, Fishkill; David L. Dosch, Apalachin, both of N.Y.; Karlheinz Dutke, Deckenpfronn, Germany; Wayne R. Longcore, Mason, Mich.

[73] Assignee: International Business Machines Corporation, Armonk, N.Y.

[21] Appl. No.: 844,358

[22] Filed: Mar. 2, 1992

[51] Int. Cl.$^6$ .............................................. G06F 13/10
[52] U.S. Cl. .................................... 395/275; 395/650; 364/DIG. 1; 364/283.3; 364/281.7
[58] Field of Search ............... 395/800, 200, 650, 275, 395/325, DIG. 1,

[56] References Cited

U.S. PATENT DOCUMENTS

| | | | |
|---|---|---|---|
| H696 | 10/1989 | Davidson | 395/275 |
| 4,453,209 | 6/1984 | Meltzer | 364/200 |
| 4,587,628 | 5/1986 | Archer et al. | 364/900 |
| 4,868,734 | 9/1989 | Idleman et al. | 395/275 |
| 5,014,194 | 5/1991 | Itoh | 364/200 |
| 5,060,142 | 10/1991 | Menon et al. | 364/200 |
| 5,063,494 | 11/1991 | Davidowski et al. | 395/800 |
| 5,170,471 | 12/1992 | Bonevento et al. | 395/275 |

FOREIGN PATENT DOCUMENTS 59-148919  8/1984  Japan .

OTHER PUBLICATIONS

Computer Architecture News, vol. 19, No. 2, Apr. 1991, "The Interaction of Architecture and Operating System Design", pp. 108–120, Anderson et al.
IBM Technical Disclosure Bulletin, vol. 31, No. 4, Sep. 1988, "Implementing Code to Run in Paged Memory Space", pp. 110–111.
Computer Journal, vol. 28, No. 4, Aug. 1985, London, Great Britian, "On Efficient Context Switching", pp.375–378, A. Ramsay.
IBM TDB, vol. 32, No. 3A, Aug. 1989, Lambeth et al., "System/370 I/O Channel Program Channel Command Word Prefetch".

Primary Examiner—Kevin A. Kriess
Assistant Examiner—Kakali Chaki
Attorney, Agent, or Firm—Arthur J. Samodovitz

[57] ABSTRACT

An I/O system including a processor, a multitasking operating system and DMA hardware efficiently controls a transfer of data between a main memory and memories of different types of devices by minimizing context switches between tasks and wait times of the tasks. A plurality of validation routines are used to validate a plurality of commands when the validation routines are called. Each of the commands corresponds to a specific type of I/O operation and a specific one of the device memories to participate in the I/O operation with the main memory. Each of the validation routines is device type specific and command type specific. A general routine responds to each of the commands by identifying and calling the validation routine which corresponds to the type of I/O operation and type of device which are specified in the command. The general routine initiates I/O hardware after the validation routine validates the command. After the I/O hardware completes the I/O operation, it signals a command completion routine which is command specific and device type specific. In response, the command completion routine signals to the general routine a state of the I/O operation. Each of the validation routines executes on the same task as the general routine to minimize context switches, and each of the command completion routines executes on a different task than the general routine to minimize wait time for the command completion routine.

23 Claims, 9 Drawing Sheets (TOP OF FIG2(b))

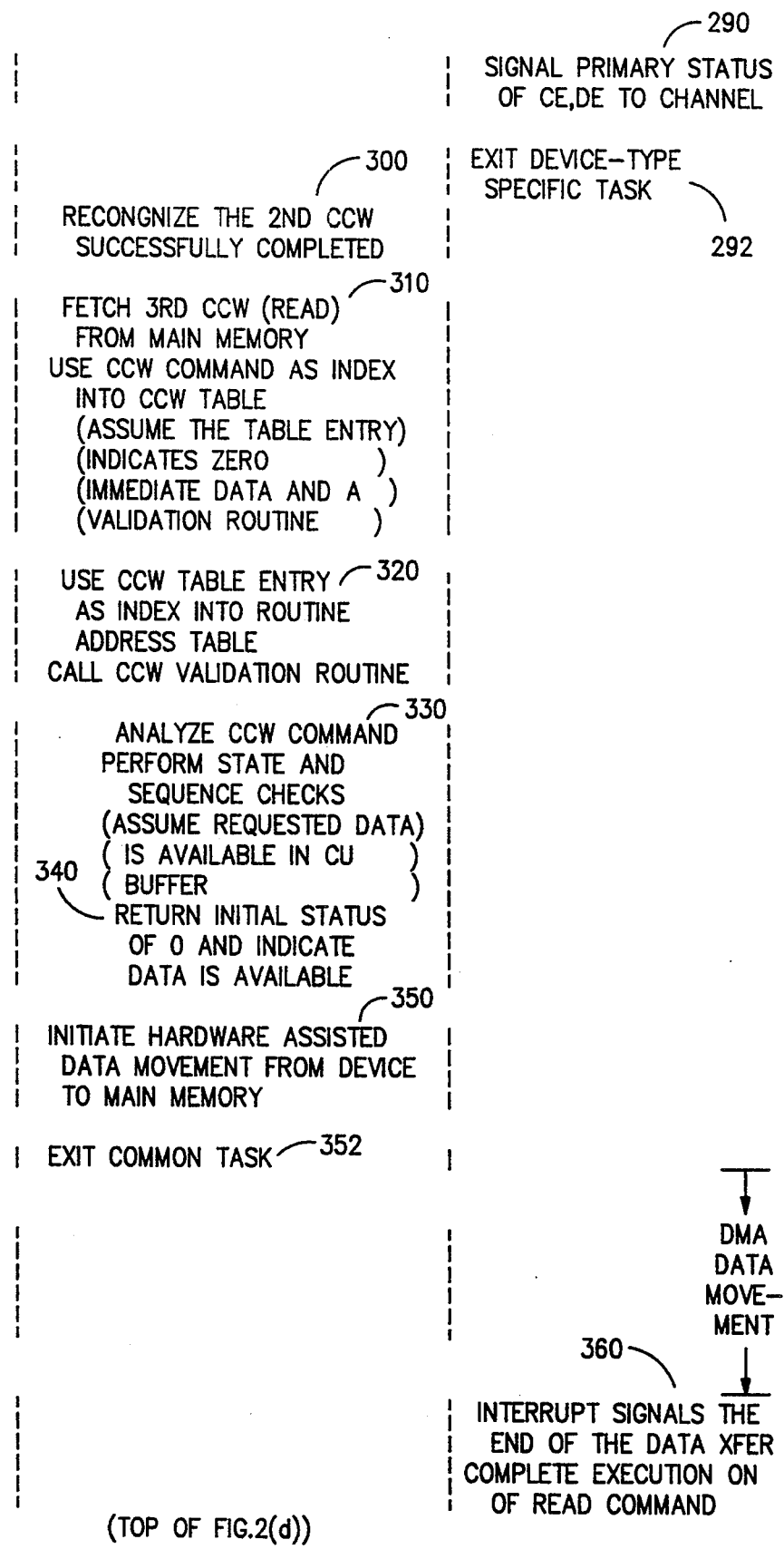

FIG.2(c)

- 300 RECOGNIZE THE 2ND CCW SUCCESSFULLY COMPLETED

- 310 FETCH 3RD CCW (READ) FROM MAIN MEMORY
  USE CCW COMMAND AS INDEX INTO CCW TABLE
    (ASSUME THE TABLE ENTRY)
    (INDICATES ZERO         )
    (IMMEDIATE DATA AND A   )
    (VALIDATION ROUTINE     )

- 320 USE CCW TABLE ENTRY AS INDEX INTO ROUTINE ADDRESS TABLE
  CALL CCW VALIDATION ROUTINE

- 330 ANALYZE CCW COMMAND
  PERFORM STATE AND SEQUENCE CHECKS
    (ASSUME REQUESTED DATA)
    ( IS AVAILABLE IN CU  )
  340 ( BUFFER              )
  RETURN INITIAL STATUS OF 0 AND INDICATE DATA IS AVAILABLE

- 350 INITIATE HARDWARE ASSISTED DATA MOVEMENT FROM DEVICE TO MAIN MEMORY

- 352 EXIT COMMON TASK (TOP OF FIG.2(d))

- 290 SIGNAL PRIMARY STATUS OF CE,DE TO CHANNEL

EXIT DEVICE-TYPE SPECIFIC TASK
292

DMA DATA MOVE-MENT

- 360 INTERRUPT SIGNALS THE END OF THE DATA XFER COMPLETE EXECUTION ON OF READ COMMAND

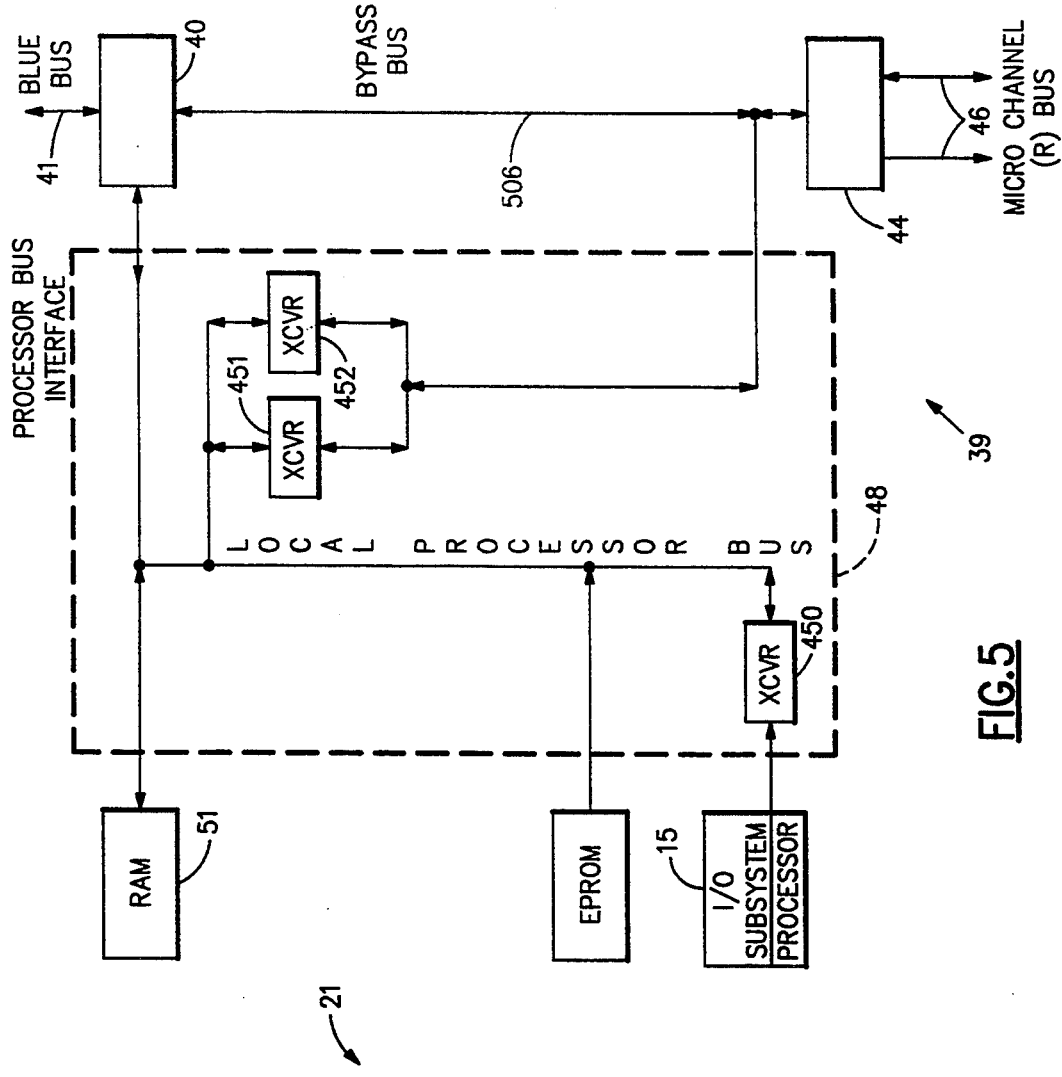

EFFICIENT CHANNEL AND CONTROL UNIT FOR HOST COMPUTER

BACKGROUND OF THE INVENTION

The invention relates generally to computer systems, and deals more particularly with an efficient channel and control unit program for a host computer, which channel and control unit program (and associated hardware) provides I/O service to a plurality of different external devices.

Most computers need to access one or more external devices such as disks or printers, and require some form of I/O service to manage the access. For example, an existing IBM System/370 computer includes a Block Multiplexor channel (comprising a processor and related program and other hardware) which provides the I/O service for a main processor. The Block Multiplexor channel relieves the main processor from the task of controlling I/O. The main processor need only initiate the Block Multiplexor channel, and the Block Multiplexor channel can directly access the main memory and transfer the data between the main memory and an I/O port of the System/370 computer. In conjunction with such a computer system, each external device also includes a control unit to manage the resources of the external device, i.e. directly access the resource and transfer the data between the resource and an I/O port of the external device. The two I/O ports are connected by a cable to complete the communication link. The channel can address a variety of different types of control units, and each control unit provides a device specific, managerial function.

Several steps are required to enable the System/370 computer to access the resource of the external device. Initially, an application program executing on the main processor requests read and write operations, and an associated operating system builds a channel program comprising channel command words (CCWS) or commands corresponding to the request. Then, the channel fetches the CCWs, and routes or "channels" the request or command to the appropriate control unit. Next, the control unit (1) validates the command to determine if it is a type that the control unit can handle, (2) determines the status of itself and the resource (busy or available), (3) reports the status to the channel, and if the control and resource are available, (4) validates the sequence in which the present command occurs, and if the sequence is valid (5) changes the status of the control unit and resource to busy, (6) requests the data from the channel in the case of a write command or requests attention by the channel in the case of a read operation, (7) initiates the associated hardware to perform the write or read operation, (8) returns a completion status to the channel and (9) changes the status of the control unit and resource to "available". These steps require frequent interplay between the channel and the control unit.

A later version of this System/370 computer system substitutes a single program which directly emulates the function of the Block Multiplexor channel and the function of each control unit. This program is executed by a multitasking operating system and provides one task to emulate the Block Multiplexor channel and another task to emulate each of the control units. Because these tasks directly emulate the Block Multiplexor channel and associated control units there is much interplay that requires many "context switches" between the channel task and each control unit task during the course of implementing a single read or write operation. A "context switch" occurs when one task stops executing on a processor and another task begins to execute on a processor. For each context switch, there is considerable overhead expended in recording where the one task stops executing and recording the contents of the associated registers and loading the registers for the other task. In the case of a write CCW within this computer system, context switches are required when the channel passes the CCW command to the control unit, the control unit passes initial status back to the channel, the channel signals an acceptance of the initial status to the control unit, the control unit requests data from the channel, and the control unit presents ending status to the channel. Also, considerable processor time is wasted by the channel task in waiting for the write or read operation to complete.

Accordingly, a general object of the present invention is to provide a single channel and control unit program which performs the foregoing channel and control unit functions but with reduced overhead and greater efficiency.

SUMMARY OF THE INVENTION

The invention resides in an I/O system which efficiently controls a transfer of data between a main memory and memories of different types of devices. The I/O system comprises a processor, a multitasking operating system for controlling program execution on the processor, and a channel and control unit program which executes on the processor. The program is divided into the following program routines which execute on the same or separate tasks as indicated, to minimize the number of context switches required to execute each command and the delay to each task.

A plurality of validation routines are provided to validate a plurality of commands when the validation routines are called. Each of the commands corresponds to a specific type of I/O operation and a specific one of the devices to participate in the I/O operation with the main memory. Each of the validation routines is device type specific and command type specific.

A general routine initially responds to each of the commands by identifying and calling the validation routine which corresponds to the type of I/O operation and type of device which are specified in the command. The I/O system also includes DMA or other I/O hardware which actually performs the I/O data movement operation. The I/O hardware is initiated after the validation routine validates the command.

After the I/O hardware completes the I/O operation, it signals a command completion routine which is device type specific. In response, the command completion routine signals to the general routine a state of the I/O operation. Each of the validation routines executes on the same task as the general routine. The command completion routine executes on a different task than the general routine. Consequently, no context switch is required between the general routine and the validation routine. This optimizes the speed at which the command is executed. While a context switch is required from the general routine to the command completion routine, this context switch is overlapped with the DMA operation so time is not wasted. A context switch is also required from the command completion routine to the general routine after the DMA operation. Neither the command completion routine nor the general routine wait while the data movement is performed by the I/O hardware. This optimizes the use of the I/O processor.

BRIEF DESCRIPTION OF THE FIGURES

FIG. 4 illustrates control unit routines which are part of the channel and control unit program and are addressed by the routine address tables of FIG. 3.

FIG. 5 is a more detailed block diagram of a processor bus interface of FIG. 1.

DETAILED DESCRIPTION OF THE PREFERRED EMBODIMENTS

Figure 1:
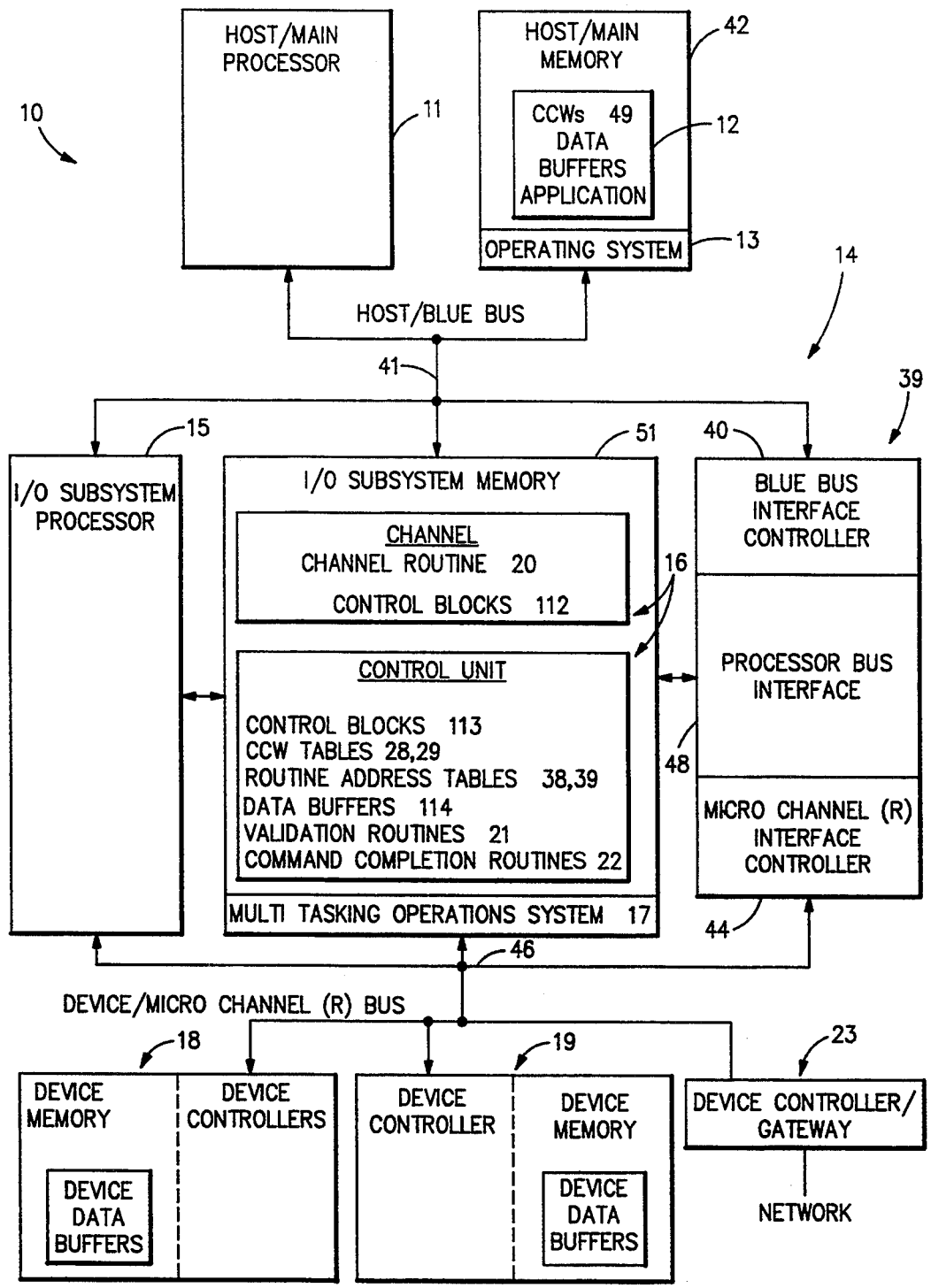
FIG. 1 is a block diagram of a host or main computer having an I/O subsystem including an I/O processor executing a channel and control unit program according to the present invention.

Referring now to the drawings in detail wherein like reference numerals indicate like elements throughout the several views, FIG. 1 illustrates a computer system generally designated 10 which includes the present invention. Computer system 10 comprises a main processor 11 which is the main processor for the computer system and executes a user application program 12 with a known operating system 13. Computer system 10 also includes an I/O subsystem 14 which provides I/O service to three different types of external devices 18, 19 and 23. I/O subsystem 14 includes an I/O processor 15 and a multitasking operating system 17. A channel and control unit program 16 according to the present invention executes on I/O processor 15. In the illustrated embodiment, operating system 13 is an IBM VM, VSE, MVS, AIX or DPPX/370 operating system, and the main processor 11 and I/O processor 14 are provided by a standard IBM System/370 or System/390 computer system models ES/9000 120 through 170. By way of example, device 18 is a direct access storage device (DASD), device 19 is a tape, and device 23 is a network.

The channel and control unit program 16 includes a general or channel routine 20, control unit CCW validation routines 21, control unit command completion routines 22, and CCW tables 28,29,33 and routine address tables 38,39,43 which the channel routine 20 uses to identify the proper control unit CCW validation routine to call. Although FIG. 1 (and subsequent Figures) illustrate only three CCW tables 28,29,33 and three routine address tables 38,39,43 there is a unique one of each per type of device which is accessed and there may be several types of such devices. To improve efficiency in accordance with the present invention, the channel routine 20 executes on the same task as the control unit CCW validation routines, and the control unit command completion routines execute on different tasks than the channel routine and control unit CCW validation routines. Also, there is just one instance of the channel routine 20 program code and this instance is common to all of the control unit CCW validation routines and command completion routines.

I/O subsystem 14 further includes a "Blue" bus controller hardware interface 40 for a main (or "Blue") bus 41 to permit direct memory access (DMA) of the main memory, a Micro Channel (R) bus controller hardware interface 44 for a Micro Channel (R) (or device bus) 46 to permit DMA access of the device memories, and a processor bus interface 48.

To access device 18, 19, or 23, application program 12 makes an appropriate write and/or read call to the operating system 13 which builds a channel program 49 in a main memory 42 according to standard System/370 or System/390 architecture. By way of example, the channel program includes one control, one write, and one read CCW in this order. The type and order of the CCWs within the channel control program defines at a high level the type and order of access to device 18, 19 or 23. The function of the operating system in building the channel program is further described in a publication entitled Enterprise Systems Architecture/390, Principles of Operation which is available from IBM Corp. at Mechanicsburg, Pa. by publication number SA22-7201, chapter 13 of which publication is hereby incorporated by reference as part of the present disclosure. The channel program is stored at a location communicated to the channel routine 20, by the operating system 13 when the channel program is initiated.

Figure 2A:
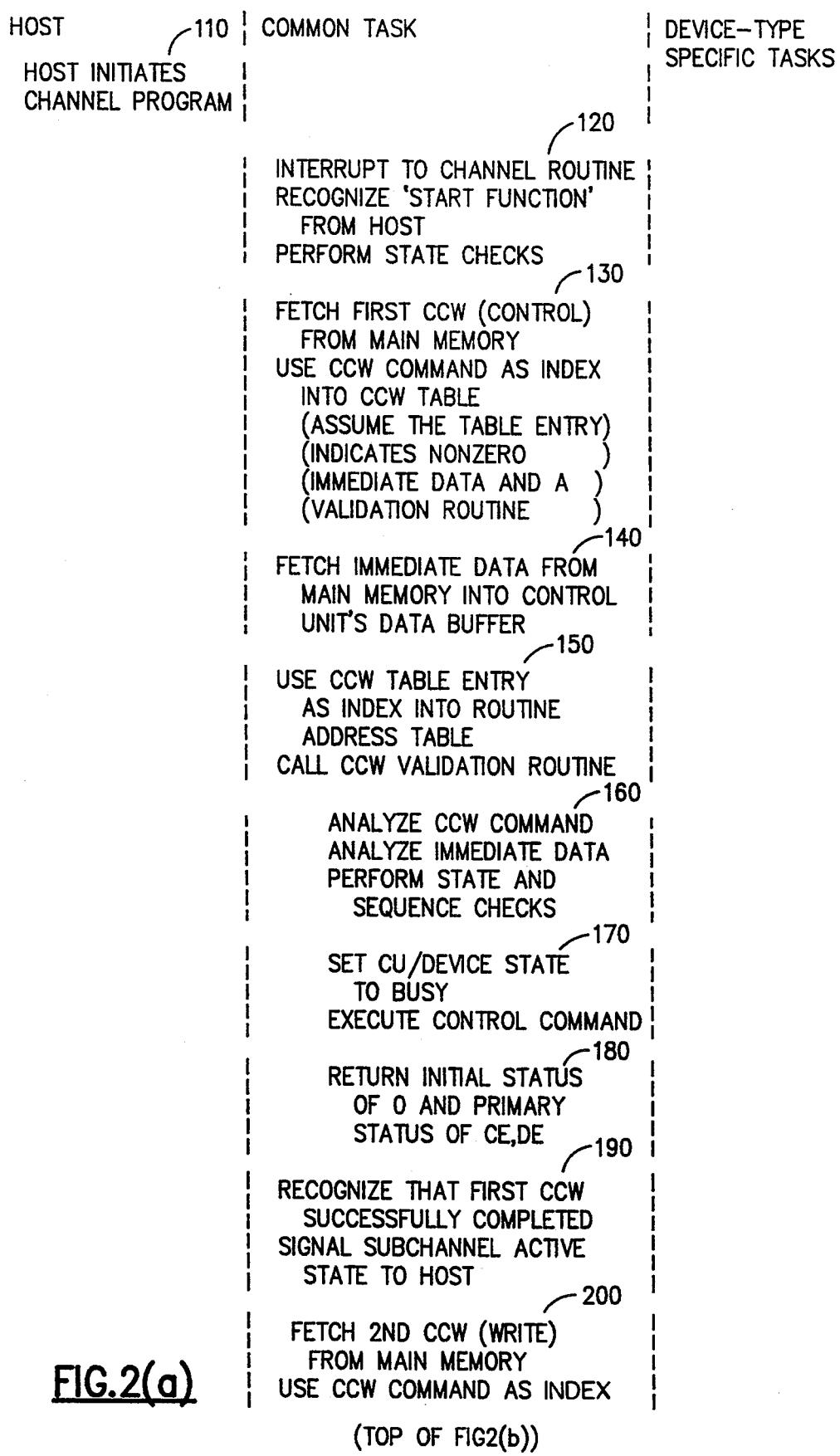
FIGS. 2 a,b,c,d form a flow chart which illustrates operation of a host application program, and a common task and device-type specific tasks of the channel and control unit program of FIG. 1.
Figure 2B:
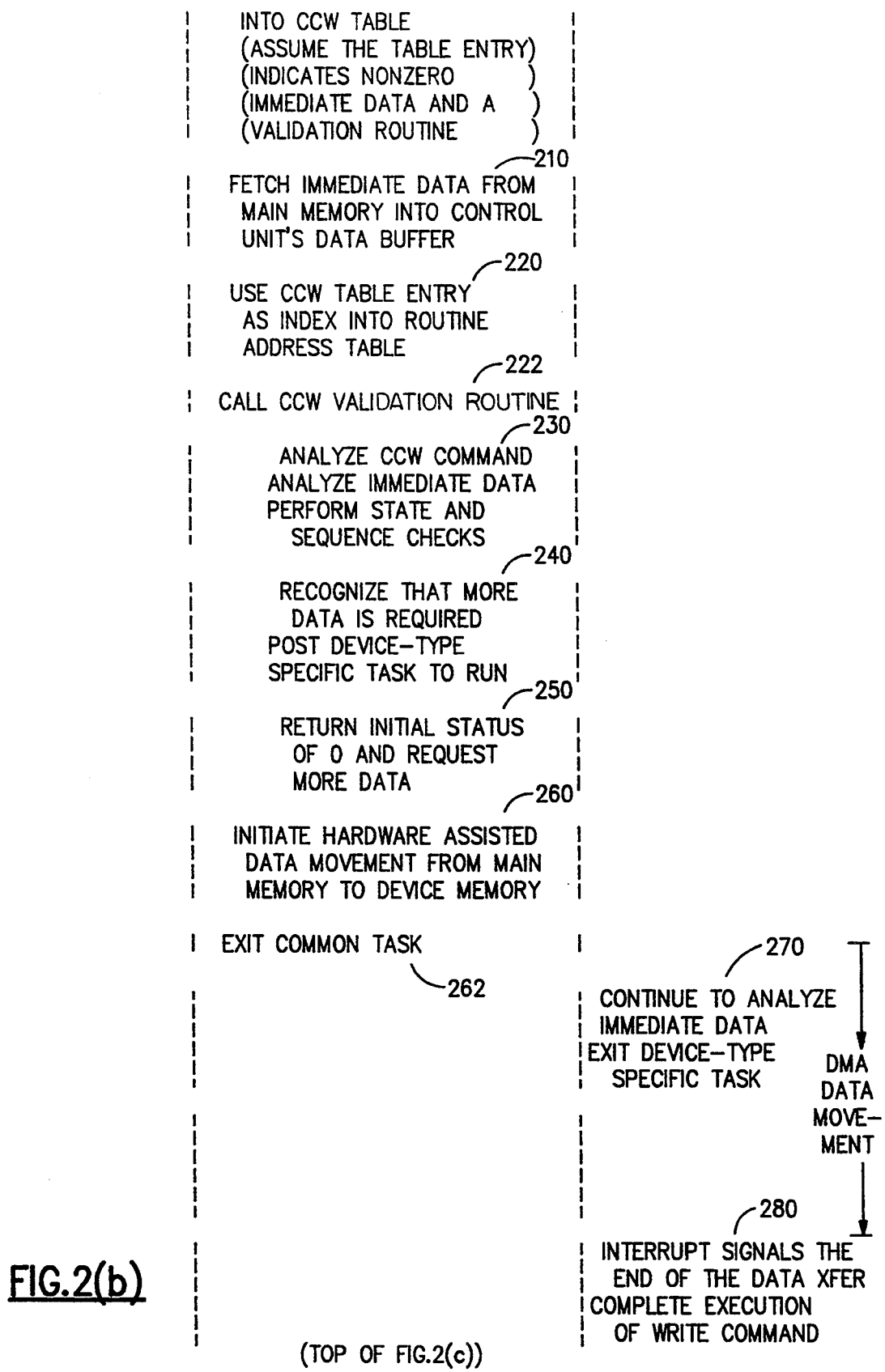
Figure 2D:
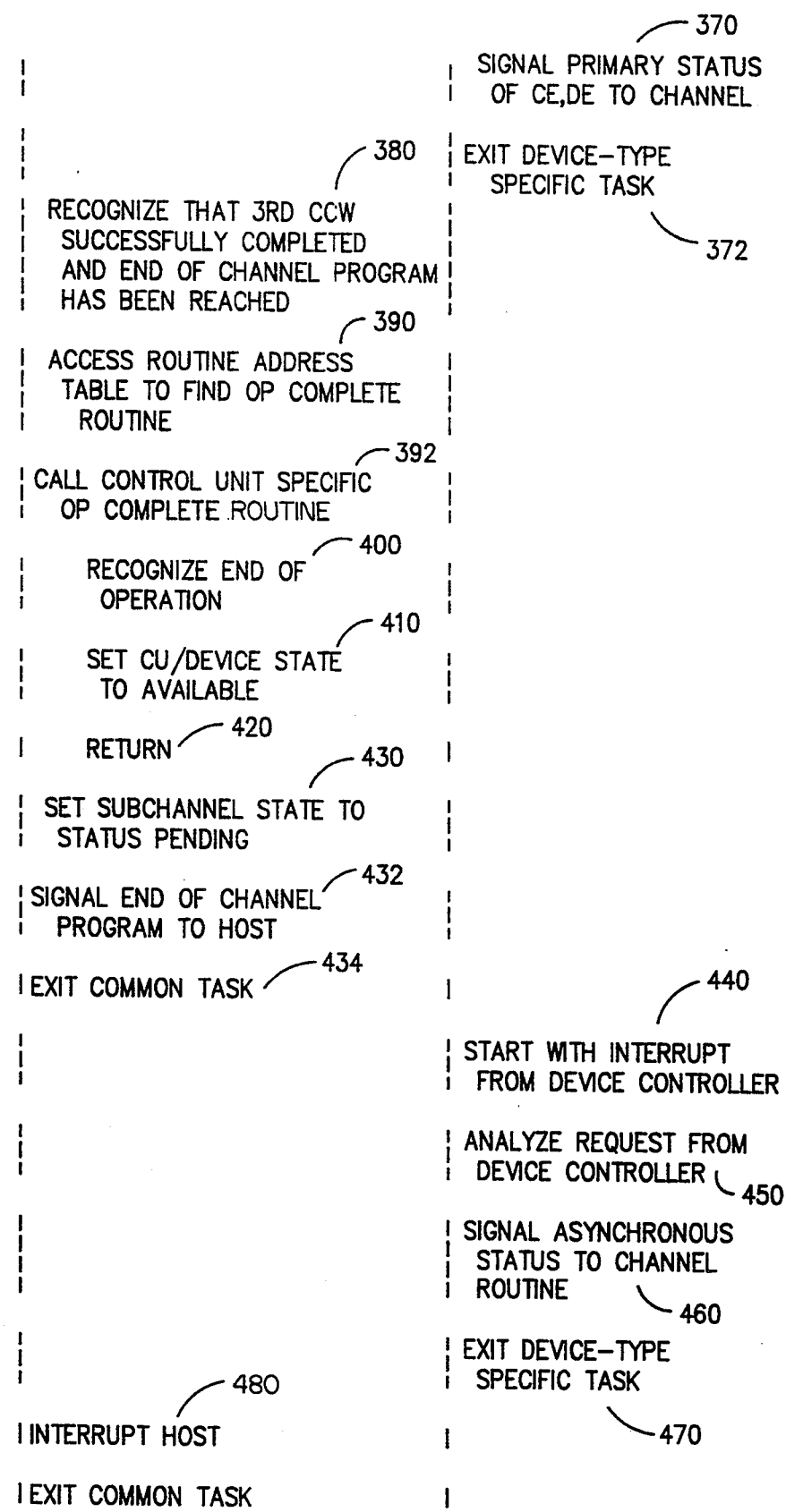

After building the channel program, the operating system 13 calls the channel routine 20 by making a "Start Subchannel" instruction (step 110 of FIG. 2). The channel routine accesses a control block 112 in RAM 51 corresponding to the device being accessed, which control block includes pointers to the CCW table 28, 29 or 33 and routine address table 38, 39 or 43 corresponding to the type of device, and a pointer to a data buffer 114 and a control block 113 in the control unit memory corresponding to the device. The information in the instruction and the channel program is used to update the control block with the type of command, byte length and data address information and other parameters in the CCW. The control block also stores the state of any operation in progress for the device and the control unit routine, which states were previously entered by the channel routine. As described in more detail below, the control unit comprises the CCW validation routines 21 and command completion routines 22.

In response to the call, the channel routine begins to execute on the I/O processor on a "common task" and performs preliminary state checks. The preliminary state checks determine if the format of the call is valid, if the channel routine is available (i.e. not busy with another channel program) and if the control unit and device are available (step 120). If any one of these checks is negative, then the Start Subchannel instruction is rejected. However, assuming the channel routine and addressed subchannel, i.e. device and associated control unit task are available and the call format is valid, the channel routine reads the first (control) CCW of the channel program from the predetermined location in RAM 42 (step 130). The control CCW (and each other type of CCW) includes command, data address, byte count and flag fields. There are various types of control commands that can be indicated by the command field. A "define extent" CCW indicates a file or range of blocks in a DASD (disk) device that will be accessed during execution of a subsequent write or read CCW. A "seek" CCW indicates what cylinder or track will be accessed, a "search" CCW indicates what record will be accessed, and a "locate" CCW indicates what data block will be accessed. For a tape device, a "Rewind" CCW indicates the tape must be rewound to its load point, and a "modeset" CCW indicates what density to use in recording data. For a network device, a "SYNC" CCW indicates that the host will soon issue a read or write CCW and the device should prepare to receive the CCW, and an "IWRITE" CCW indicates what conditions under which the device should generate an asynchronous interrupt. The byte count field indicates the length of the aforesaid data that the application program or operating system stored in connection with this CCW to be read by the control unit, and the data address field indicates the location of this data in main memory 42. The flag field indicates whether there are additional CCWs in the channel program.

Figure 3:
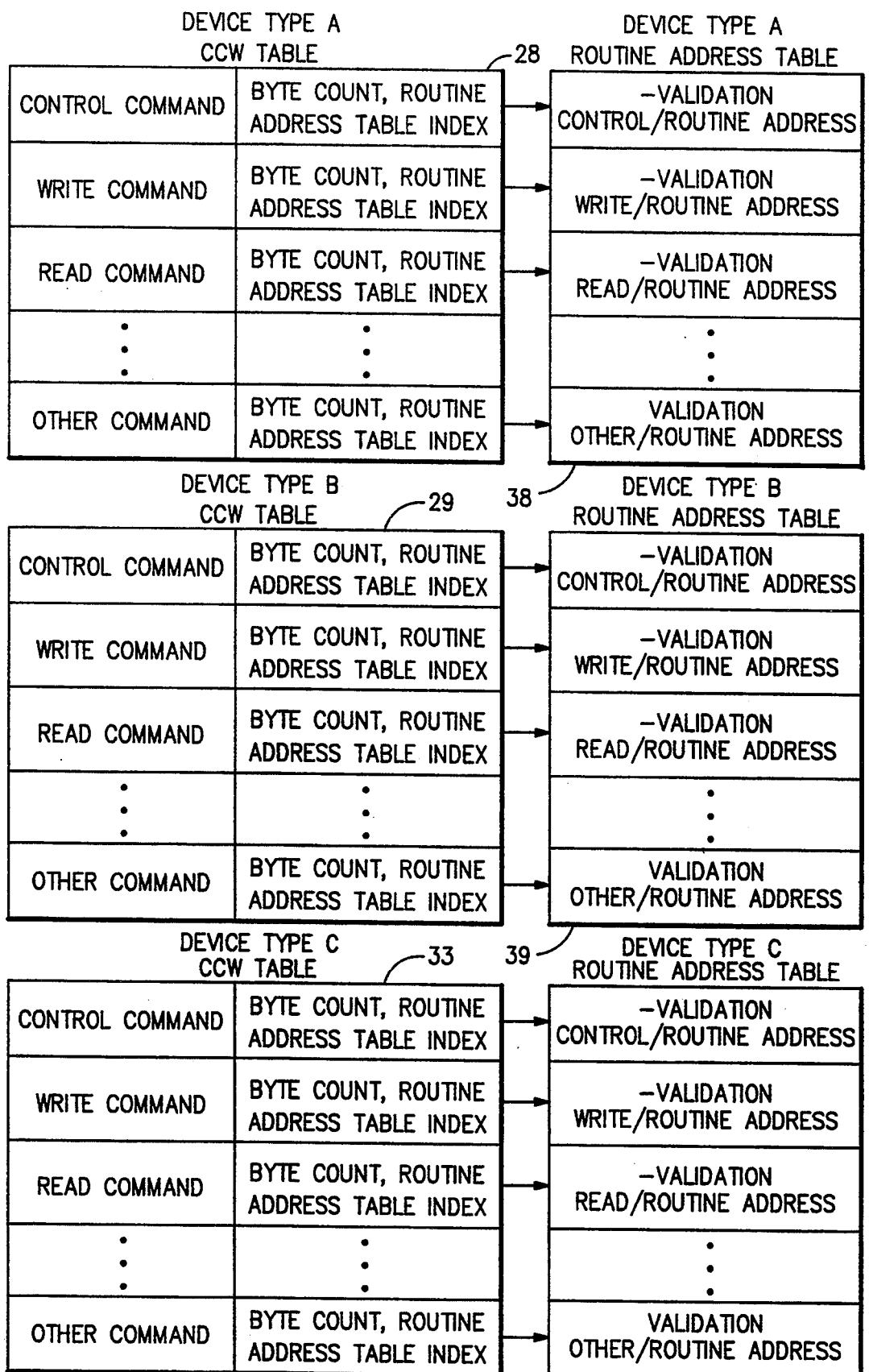
FIG. 3 illustrates three CCW tables, A-C, and respective routine address tables which are used by the channel and control unit program of FIG. 2 to provide I/O service to three different external devices.

FIG. 3 illustrates the CCW tables 28, 29 and 33 and routine address tables 38, 39 and 43 in more detail. The address of one of each is stored in the control block 112 corresponding to the device to be accessed. The channel routine uses the command-type information from the CCW to identify a corresponding command specific entry in the CCW table. The command specific entry includes a byte count which indicates the length of data that the channel routine needs to prefetch for the specific device-type and command-type, and an index into the routine address table 38, 39 or 43.

Assuming that the byte count field is greater than zero, the channel routine prefetches data from the main memory location indicated by the data address field of the CCW which is stored in the control block 112, and stores the data in buffer 114 (step 140). The foregoing operation is considered a "prefetch" because the data will be subsequently used by a CCW validation routine of the control unit which is not yet executing and has not yet asked for the data. The channel routine uses the other field of the CCW table command specific entry as an index to identify a command specific entry from the corresponding routine address table (step 150).

The identified entry in the routine address table points to a location in RAM 51 which begins a CCW validation routine. FIG. 4 illustrates a multiplicity of CCW validation routines 21. Each CCW validation routine is subchannel/device specific and command specific. The channel routine then calls that CCW validation routine and passes the address of the appropriate subchannel control block 112 as a parameter.

The CCW validation routine is a control unit routine but executes on the common task to avoid an inefficient context switch. In step 160, the CCW validation routine determines if the command is a type which the control unit can handle, and whether the control unit is in a proper state (i.e. available) to process the CCW. The following are examples of types of CCWs that a control unit for a fixed block DASD type of device is capable of processing:

Locate—identifies first block that will be accessed.
Define Extent—identifies files or range of blocks that will be accessed.
Read
Read IPL
Write
Basic Sense—requests error information
Read Device Characteristics
Read and Reset Buffer Log—request a read of an entire error log.
Sense ID—requests identification of type of device.
Diagnostics The following are examples of types of CCWs that a control unit for a tape device is capable of processing:
Rewind
Modeset
Unload
Erase Gap
Write Tape Mark
Backspace Block
Backspace File
Forward Space File
Write
Read
Read Backward
Basic Sense
Sense ID The following are examples of types of CCWs that a control unit for a network is capable of processing:
SYNC—data synchronization
PWRITE—data parameters write
SETCETI—set CETI mode on
IWRITE—interrupt parameters write
IPREP—interrupt port prepare
CWRITE—control block write
DWRITE—data buffer write
CREAD—control block read
DREAD—data buffer read
SENSE—read sense data
SENSE ID—read identification Both the control unit and the device must be available for the CCW validation routine to accept the CCW. Usually both the control unit and the device exhibit the same state. However, if the control unit services more than one device (of the same type), then the control unit can be busy when one of the devices is available. Also, some devices can perform work without assistance from the respective control unit, in which case, the device can be busy when the control unit is available. If either the control unit or device is busy, then the channel routine will redrive the subchannel later and the foregoing steps will be repeated. The CCW validation routine continues with step 170 when the CCW is an acceptable type and the control unit and device are both available. In step 170, the CCW validation routine changes the control unit state and the corresponding device state to "busy with this channel program" by storing such status information in the respective control block 113. Then, using the parameters passed by the channel routine and the control data which was prefetched into the respective data buffer 114, the CCW validation routine is able to execute the control command. This assumes that all of the control CCW control data was prefetched, which is normally the case because most control CCWs have a small byte count. Next, the CCW validation routine returns to the channel routine and passes unit status as parameters (step 180). The "unit" status indicates whether the CCW validation routine accepted the CCW and, if so, the action that the CCW validation routine took in response to the CCW. Zero initial status indicates that the command was accepted, and primary status of channel end and device end indicates that the command has been executed without error. The other statuses are described in the Principles of Operation publication previously referenced.

Next, the channel routine signals operating system 13 that it has begun executing the channel program (step 190). At this point, the first (control) CCW of the channel program has been completely executed within the context of the common task with no task or context switches.

Based on the content of the flag byte from the first CCW, the channel routine which is still executing on the common task, continues execution of the channel program (step 190). The channel routine reads the next (write) CCW of the channel program from a location in main memory 42 sequential to the previous CCW and stored in control block 112 (step 200). The write CCW includes command, data address, byte count and flag fields. The byte count field indicates the length of data that the application program stored in main memory 42 to be written to the device pursuant to this CCW, and the data address field indicates the location of this data in main memory 42. (Operating system 13 can divide data that the application program desires to write between two or more write CCWs.) The flag field indicates whether there are additional CCWs in the channel program. The channel routine continues to access the same subchannel control block 112 which identifies the corresponding CCW table and routine address table. The command field in the CCW identifies a corresponding command specific entry from the CCW table.

The command specific entry includes a byte count which indicates the length of data that the channel routine needs to prefetch for this specific device type and command-type, and an index into the routine address table. If the byte count field is greater than zero, the channel routine prefetches the data from the main memory location indicated by the data address field of the CCW, and stores the data in the respective data buffer 114 in RAM 51 which is accessible by the control routine (step 210). For this example, assume that the data block in main memory 42, which is addressed by the CCW data address, consists of two portions, a relatively small amount of control data, and a larger block of data to be written to the device. The control data is a header which indicates the destination (file, block, track or record) of the remaining data within the device. Only the control data has been prefetched. The channel routine uses the other field of the CCW table entry as an index to identify a command specific entry from the respective routine address table (step 220). The respective routine address table entry contains the location in RAM 51 of the CCW validation routine that corresponds to this device type and the write CCW. The channel routine then calls that CCW validation routine and passes the CCW address of the appropriate subchannel control block 112 as a parameter (step 222).

The CCW validation routine is considered part of the control unit but executes on the common task to avoid an inefficient context switch. In step 230, the CCW validation routine determines if it should accept the command based on whether this CCW is a type which the control unit is capable of processing and whether the control unit and device are both available. Devices 18, 19 and 23 (as well as most devices) are capable or processing a write CCW. The control unit and device are both available if both are not busy at all or if both are busy with this channel program. Because this is a continuation of a channel program which is already in progress, both the control unit and device will be available. The CCW validation routine continues with step 240 if the CCW is an acceptable type. In step 240, the CCW validation routine compares the byte count parameter passed by the channel routine to the byte count stored in the CCW table, and determines if there is additional, device data to be fetched from the main memory. In the illustrated example this is the case, so the CCW validation routine returns an initial status of zero (indicating that the write command is accepted), requests more data from the channel routine and provides the address of another buffer memory in device 18, 19 or 23 to receive the device data (step 250).

To further optimize the execution of the write CCW, the channel routine now initiates Blue bus interface controller 40 and Micro Channel (R) interface controller 44 via processor bus interface 48 to transfer data from the main memory 42 to the device (step 260), "posts" the respective device-type specific task to execute the respective command completion routine, and then exits itself. The parameters required for the DMA initiation, and the controllers 40 and 44 are described in more detail below with reference to FIGS. 5–7. In step 270, the device-type specific task begins to execute and analyzes the control data that was prefetched first with this write CCW. During this analysis, the device-type specific task determines what action must be taken with the remaining data. For example, if the device to be accessed is network 23, then the header indicates a specific destination device on the network, routing information and a protocol for the data, and this header is analyzed while the data is being transferred to intermediary buffers within the network device controller. However, for a DASD or tape type of device 18 or 19, generally there is no control data sent with the write CCW. Thus the transfer of the data from the main memory to the device by the Blue bus interface controller 40 and Micro Channel (R) interface controller 44 occurs concurrently with the execution and analysis of the control data, if any. After the data transfer to the device is completed, the Blue bus interface controller interrupts the I/O processor to resume execution of the device-type specific task, and the command completion routine completes execution of the write CCW by verifying that all of the data was moved without error (step 280).

Next, the command completion routine stores primary status of channel end and device end in the respective control block 112 to indicate to the channel routine (when subsequently executed) that the write operation has been successfully completed (step 290). Next, the command completion routine posts the common task and exits the device-type specific task (step 292).

The channel routine resumes execution on the common task and reads the next (read) CCW of the channel program from RAM 42 (step 310). The read CCW includes command, data address, byte count and flag fields. The byte count field indicates the amount of data that the application program desires to read from the device, and the data address field indicates the location in main memory 42 to store the data which will be read. The flag field indicates that there are no more CCWs in this channel program. The channel routine continues to access the same subchannel control block 112 which identifies the corresponding CCW table and routine address table. The channel routine uses the command type in the read CCW to identify a corresponding command specific entry from the CCW table.

The command specific entry includes a byte count which should be zero because this is a read operation and there is no control or actual data to prefetch. The command specific entry also includes an index into the corresponding routine address table. Because the byte count equals zero, the channel routine does not attempt to prefetch control or actual data from the main memory. The index into the routine address table identifies a CCW validation routine that is specific to the type of device to be accessed and the type of command. The channel then calls that CCW validation routine and passes the address of the appropriate subchannel control block 112 as a parameter (step 320).

The CCW validation routine is considered part of the control unit but executes on the common task to avoid an inefficient context switch. In step 330, the CCW validation routine determines if the control unit should accept the command based on whether the CCW is a type which the control unit and device are capable of processing and whether the control unit and device are both available for this channel program. Devices 18, 19 and 23 (as well as most devices) are capable of processing a read CCW. Since this is a continuation of a channel program which is already in progress, both the control unit and device will be available. If the CCW is accepted, the CCW validation routine continues with step 340 in which the CCW validation routine determines from the nature of the command that data must be transferred from the device to main memory 42, and therefore, returns a request to move data to the specified location in the main memory.

In response to the return, the channel routine initiates the data transfer from the device 18, 19 or 23 to main memory 42 by initiating the Blue bus interface controller 40 and Micro Channel (R) interface controller 44 and providing the address in main memory 42 to receive the data and data length (step 350). Because such a transfer generally requires considerable time, the channel routine exits the common task after initiating the controllers 40 and 44 (step 352). In accordance with the present invention, such exiting is generally more efficient than having the common task wait for the data transfer to complete.

After the data transfer from the device to the main memory is completed, the Blue bus interface controller 40 interrupts the I/O processor to resume execution of the command completion routine within the device-type specific task. A DMA end interrupt handler routine which handles the interrupt knows which device-type specific task to post based on information stored in RAM 51 by the channel routine when the DMA was initiated. In response, the command completion routine completes execution of the read command by verifying that all of the data was moved without error (step 360). Then the command completion routine stores primary status of channel end and device end in the respective control block 112 to indicate to the channel routine (which will subsequently execute) that the read operation has been successfully completed (step 370). Next, the command completion routine posts the common task, and exits the device-type specific task (step 372).

Now, the channel routine resumes execution, and the channel routine recognizes from the control block 112 that the read CCW has successfully completed. The channel routine also recognizes from flag field information stored in control block 112 that the end of the channel program has been reached (step 380). Next, the channel routine reads another entry from the routine address table which entry is located at a fixed offset into the routine address table and indicates the location of a control unit specific "operation complete" routine (step 390). The channel routine calls this routine in step 392. The operation complete routine executes in the context of the common task to provide end of operation processing. During such processing, the operation complete routine recognizes the end of operation (Step 400) and then resets the control block 112 to indicate that the control unit state and device state are now both available (step 410). Then, the operation complete routine returns to the channel routine (step 420).

The channel routine then sets the subchannel state to status pending to indicate that the execution of the channel program is complete, signals to the operating system 13 that the channel program has been completed (step 432) and then exits the common task (step 434).

It should be noted that execution of the entire channel program consisting of the control, write and read CCWs required a context switch in the critical path only after step 290 and step 372. Task switches after step 260 and step 350 do not add to the execution time of the channel program because they are overlapped with the DMA data movement. This greatly improves efficiency compared to the five task switches in the respective critical paths required to execute each CCW in the prior art described above in the Background Of The Invention for the first IBM System/370 computer system which provided an integrated channel and control unit program to replace a physical channel and control unit.

FIG. 2 (d) further illustrates that the device-type specific task also services asynchronous requests from the device controllers that are not responsive to a CCW and are initiated by the device itself. For example, a tape controller can respond to the manual loading of a tape by interrupting the device-type specific task (step 440) and reporting asynchronous status to the device-type specific task. In response, the device-type specific task analyzes the report from the tape controller (step 450), provides asynchronous status information for the channel routine (step 460), and then exits itself (step 470). Then, the channel routine resumes execution on the common task, notes the asynchronous status of the tape controller and sends an I/O interrupt to operating system 13 (step 480). Then the operating system 13 can generate a channel program including a read CCW to read the label of the tape.

As another example, for a computer terminal type of device, the computer terminal can respond to the pressing of an enter key by interrupting the device-type specific task (step 440) and reporting the pressing of the enter key to the device-type specific task. In response, the device-type specific task analyzes the report (step 450), provides asynchronous status information for the channel routine (step 460) and exits itself (step 470). Then, the channel routine executes on the common task and sends an I/O interrupt to operating system 13 (step 480), and the operating system 13 can generate a channel program including a read CCW to read the keyboard entry.

Figure 6:
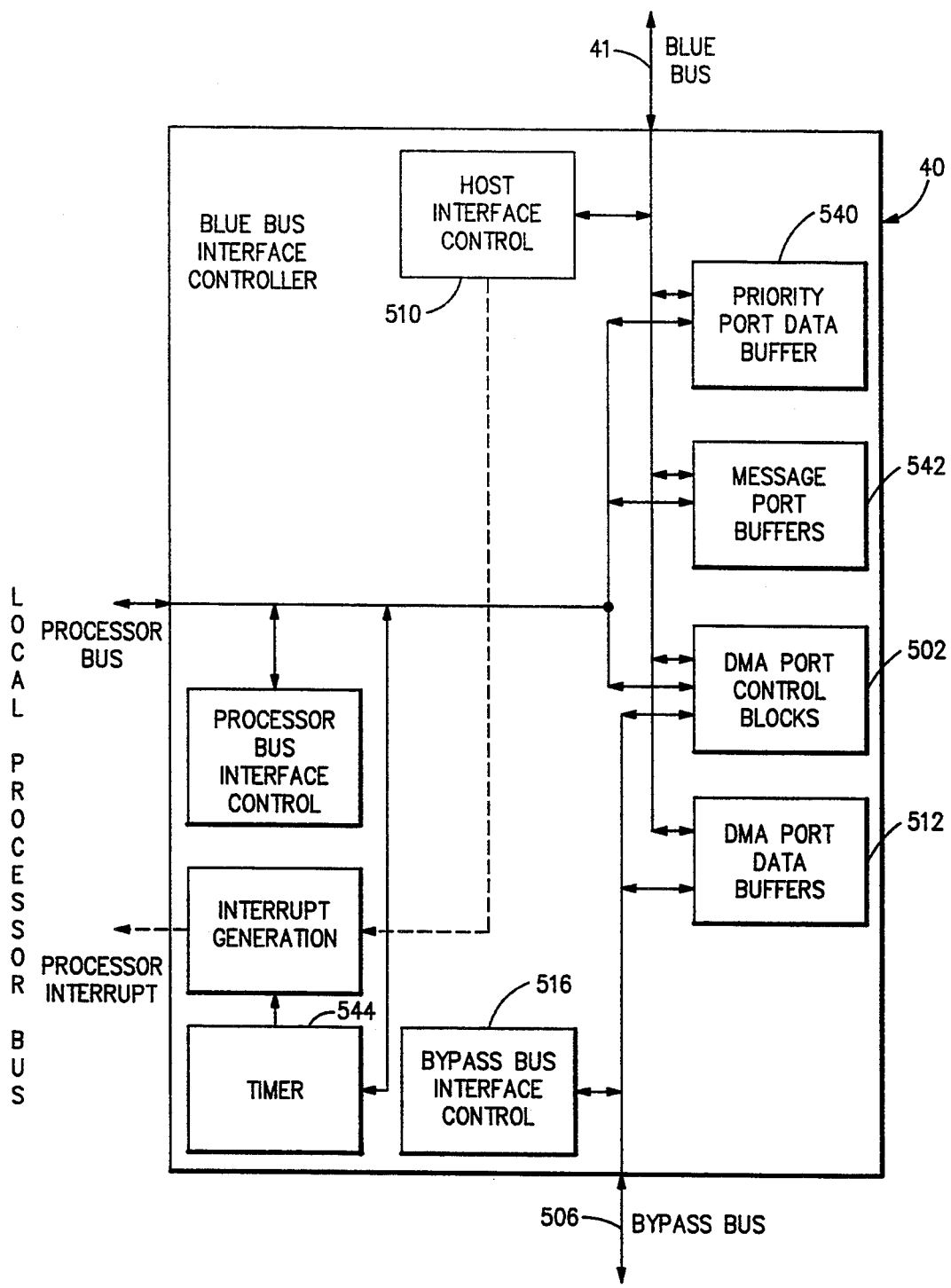
FIG. 6 is a more detailed block diagram of a Blue (or host) bus interface controller of the I/O subsystem of FIG. 1 to permit DMA access of the main memory.
Figure 7:
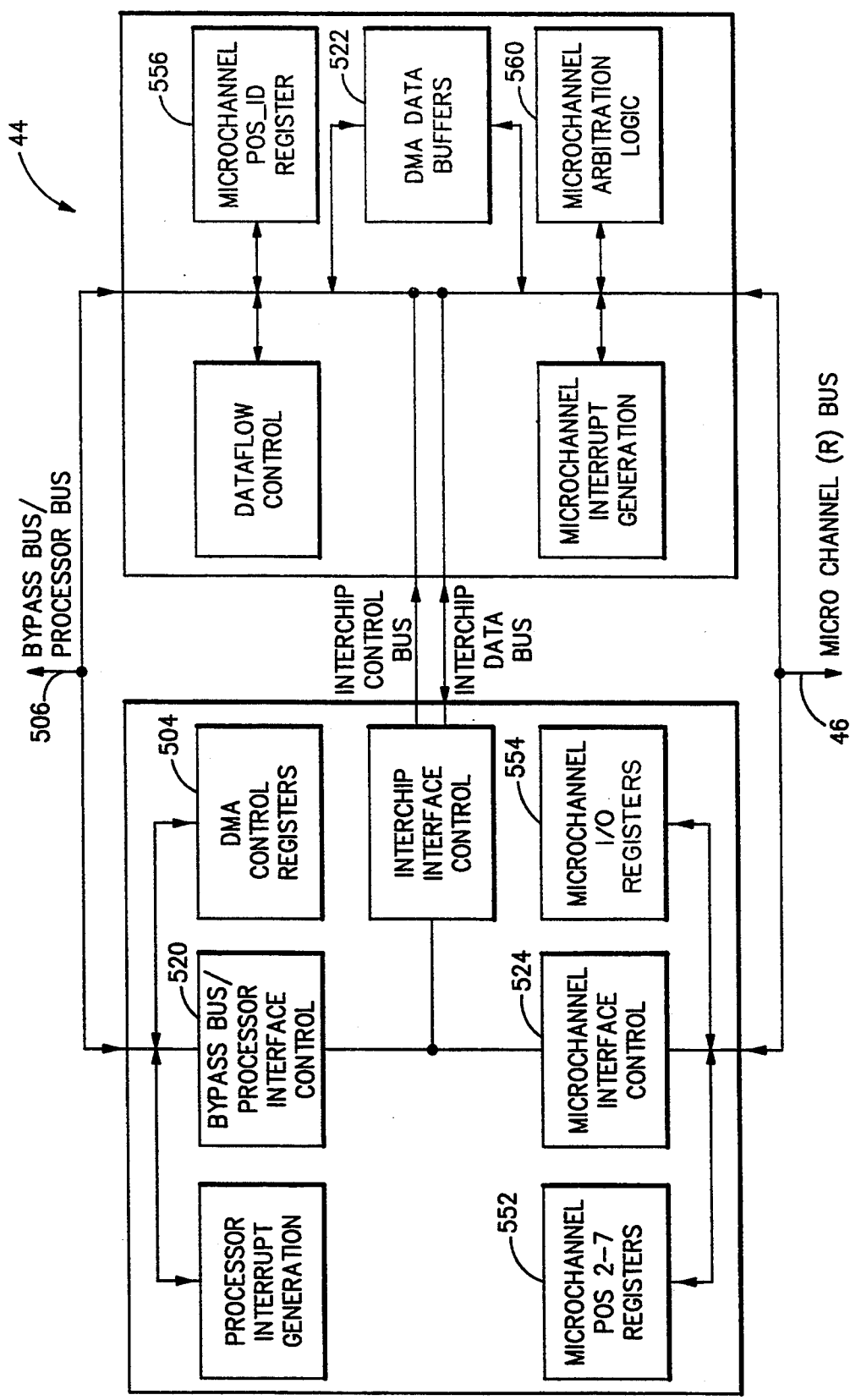
FIG. 7 is a more detailed block diagram of a Micro Channel (R) (or device) bus interface controller of the I/O subsystem of FIG. 1 to permit DMA access of the device memories.

FIGS. 5, 6 and 7 illustrate the I/O processor bus interface 48, the Blue Bus Interface controller 40 and the Micro Channel (R) interface controller 44, respectively, in more detail. The controllers participate by direct memory access in writing data from main memory 42 to the memory within device 18, 19 or 23, and reading data from the memory within either device 18, 19 or 23 into main memory 42.

The processor bus interface 48 comprises a local processor bus for the I/O processor 15 and transceivers 450–452. As noted above, the channel for I/O processor 15 routine in step 260 initiates the controllers to perform the write operation. As part of the initiation, the channel routine writes the starting address of the main memory and the byte count into a DMA port control block 502 in the Blue bus interface controller. Also, the channel routine writes the starting address of the memory of the device to receive the data as well as the byte count into a DMA control register 504 within the Micro Channel (R) interface controller. Next, the channel routine writes a command into the DMA control register 504 to move the data from a bypass bus 506 to the Micro Channel (R) bus 46. Then, the channel routine writes a command into the DMA port control block 502 to move the data from the Blue bus 41 to the bypass bus.

Host interface control logic 510 reads the command, address and byte count from the DMA port control block 502, fetches the data from the main memory and stores the data into two DMA port data buffers 512 in the Blue bus interface controller. As the host interface control logic 510 fetches and stores the data, the host interface control logic also increments the host memory address and decrements the byte count in the DMA port control block. When one of the DMA port data buffers becomes full, the host interface control logic checks whether the other DMA port data buffer is empty. If so, the host interface control logic fills this other DMA port data buffer. When both DMA port data buffers are full, the host interface control logic waits for one to become empty as follows.

When either DMA port data buffer becomes full, bypass bus interface control logic 516 in the Blue bus interface sends this data to bypass bus/processor interface control logic 520 within the Micro Channel (R) interface controller via the bypass bus. Upon receipt, the data is stored into two DMA data buffers 522. When one of the DMA data buffers becomes full, the control logic 520 fills the other DMA data buffer if it is empty; otherwise the control logic 520 waits for one of the DMA data buffers to empty as follows.

When one of the DMA data buffers becomes full, Micro Channel (R) interface control logic 524 reads the device memory starting address and byte count from the DMA control registers 504, fetches the data from the DMA data buffers and stores the data in the memory of the target device 18 or 19. While, the control logic 524 fetches and stores the data, the control logic 524 also increments the device memory address and decrements the byte count in the DMA control registers. When the byte count in the DMA port control block reaches zero, the control logic 510 generates an interruption request to the I/O subsystem processor 15. The interruption of the I/O subsystem processor cause an interrupt handler to run. The interrupt handler reads status information and residual byte count from the DMA port control block 502 within the Blue bus interface controller, and status information and residual byte count from the DMA control registers 504 within the Micro Channel (R) interface controller to determine if the write operation completed successfully. The interrupt handler then posts the appropriate device-type specific task to execute in step 280 and also indicates that the write operation completed successfully. If the write operation did not complete successfully, the interrupt handler passes the status and byte count information to the device-type specific task.

In step 350 of FIG. 2, the channel routine initiates a read operation. As part of the initiation, the channel routine writes the starting address of the main memory to receive the data and the byte count into the DMA port control block 502 within the Blue bus interface controller. Also, the channel routine writes the starting address of the device memory from which the data should be read and the byte count into the DMA control register 504 in the Micro Channel (R) interface controller. The channel routine also writes a command into the DMA control register 504 to move data from the Micro Channel (R) bus to the bypass bus, and a command into the DMA port control block 502 to move data from the bypass bus to the Blue bus.

The Micro Channel (R) interface control logic 524 fetches the data from the device memory based on the device memory address and byte count stored in the DMA control registers, and stores the data into the two DMA data buffers 522. While control logic 524 fetches and stores the data, the control logic 524 also increments the device memory address and decrements the byte count in the DMA control registers. When one DMA data buffer becomes full, the control logic 524 fills the other DMA data buffer if it is empty. If neither DMA data buffer is empty, the control logic 524 waits for one to become empty as follows.

When one of the DMA data buffers becomes full, the bypass bus/processor interface control logic 520 fetches this data and sends it to the bypass bus interface control logic 516 within the Blue bus interface controller via the bypass bus. Upon receipt, the bypass bus interface control logic 516, stores the data into the DMA port data buffers 512.

When one of the DMA port data buffers 512 becomes full, the host interface control logic 510 fetches this data and stores this data in main memory 42 at an address stored in the DMA port control block 502. As the control logic fetches and stores this data, the control logic also increments the main memory address and decrements the byte count in the DMA port control block. When the byte count in the DMA port control block becomes zero, the control logic 510 generates an interruption request to the I/O subsystem processor. The interruption to the I/O subsystem processor causes an interrupt handler to begin executing. The interrupt handler reads status information and the residual byte count in the DMA port control block 502 within the Blue bus interface controller, and status information and the residual byte count in the DMA control register 504 within the Micro Channel (R) interface controller to determine if the read operation completed successfully. Then the interrupt handler posts the appropriate device-type specific task and indicates that the read operation has completed successfully. The operation complete routine begins to execute in step 360 of FIG. 2. If the read operation did not complete successfully, the interrupt handler passes the status and byte count information to the device-type specific task.

In addition to the foregoing components within the Blue bus interface controller, a priority port 540 is used for transfers of less than sixty five bytes. This capacity accommodates one CCW and is used by the channel routine to fetch CCWs. The CCW transfer is not delayed by data within the DMA port data buffers. The priority port is also used to prefetch the immediate data as indicated by the CCW table entry.

Message port buffers 542 are used for communication in both directions between the main processor 11 and the I/O subsystem processor. Such messages include the start subchannel signal which initiates the channel program and the signal from the channel routine which indicates that the channel program is completed.

A timer 544 is used to generate interruptions to the I/O subsystem processor 15 when error conditions prevent operations from completing within the expected time period.

In addition to the foregoing components with the Micro Channel (R) interface controller, Micro Channel (R) programmable options select (POS) 2-7 registers 552 store information defining different characteristics and modes of operation of the Micro Channel (R) bus, Micro Channel (R) I/O registers 554 provide the interface between the control unit and device controllers within the devices. A Micro Channel (R) Pos ID register 556 contains the value which identifies the adapter type to other units which are attached to the Micro Channel (R) bus. Dataflow control logic 558 controls the flow of data between the Micro Channel (R) bus and the bypass bus. This includes byte alignment, parity generation, and parity checking. Micro Channel (R) arbitration logic 560 arbitrates for control of the Micro Channel (R) bus.

Based on the foregoing, a computer system embodying the present invention has been disclosed according to the present invention. However, numerous modifications and substitutions can be made without deviating from the scope of the present invention. For example, the invention is useful in computer systems which do not rely upon channel programs and instead pass commands from the application program to the channel routine. Also, the invention is useful in computer systems which do not have DMA hardware such as 40 and 44 but other hardware which acts subserviently with the main processor and device controller to effect the data transfers. Therefore, the invention has been disclosed by way of illustration and not limitation, and reference should be made to the following claims to determine the scope of the present invention.

We claim:

1. An I/O system for controlling transfer of data between a memory of a host processor and a plurality of different types of device controllers, said I/O system comprising:
 a plurality of first programmed means, within an other processor, for determining if a plurality of respective device controller types support specific I/O commands;
 second programmed means, within said other processor and responsive to an I/O command to perform an I/O operation on a specific device controller, for identifying and invoking execution of a program within the corresponding first programmed means associated with a type of said specific device controller and, if said specific device controller supports the command, invoking execution of a program within said specific device controller;
 third programmed means, within said other processor, for receiving I/O operation state information from said specific device controller and signalling the state information to said second programmed means; and
 multitasking operating system means for controlling execution of the program within said corresponding first programmed means and a program within said second programmed means on said other processor in a common task, and a program within said third programmed means on said other processor in a different task.

2. An I/O system as set forth in claim 1 wherein said third programmed means receives said I/O operation state information as an interrupt.

3. An I/O system as set forth in claim 1 wherein said second programmed means also determines if said specific device controller is available before invoking execution of the program within said corresponding first programmed means.

4. An I/O system as set forth in claim 1 wherein said I/O operation state information indicates completion of said I/O operation and initiates said task containing the program within said third programmed means.

5. An I/O system as set forth in claim 1 wherein said corresponding first programmed means is specific to a control command and sets a status of said specific device controller to busy.

6. An I/O system as set forth in claim 5 further comprising
 fourth programmed means, within said other processor and responsive to an I/O state completion signal from said third programmed means, for resetting the status of said specific device controller from busy to available; and
 wherein said operating system means controls execution of a program within said fourth programmed means on said other processor in said common task.

7. An I/O system as set forth in claim 1 wherein said other processor is an I/O processor, and said commands originate with calls from an application program executing on said host processor.

8. An I/O system as set forth in claim 7 wherein an operating system which controls execution of said application program on said main processor converts said calls to channel command words which comprise said commands, and said second programmed means fetches said channel command words one at a time.

9. An I/O system as set forth in claim 8 wherein said second programmed means, after being signalled by said third programmed means that execution of said command has been completed, fetches another channel command word.

10. An I/O system as set forth in claim 1 wherein each of said first programmed means is command type specific.

11. An I/O system as set forth in claim 1 wherein the program within said second programmed means is provided by a single instance of program code which is common to programs within all of said plurality of first programmed means.

12. An I/O system as set forth in claim 1 wherein said second programmed means terminates said common task upon invoking execution of the program within said specific device controller.

13. An I/O system as set forth in claim 1 wherein said third programmed means analyzes control information associated with the command while said specific device controller performs the I/O operation.

14. An I/O system as set forth in claim 1 wherein said third programmed means comprises a plurality of device controller-type specific programs which are executed on said other processor in different tasks than each other and different tasks than said common task.

15. An I/O system as set forth in claim 1 wherein each of said first programmed means also determines if said common task is available to execute said command.

16. A method for controlling transfer of data between a memory of a host processor and a plurality of different types of device controllers, said method comprising the steps of:

receiving a command to perform an I/O operation to a specific device controller, and in response, executing a first sequence of program steps on an other processor to identify and invoke execution of a second sequence of program steps corresponding to a type of said specific device controller;

executing said second sequence on said other processor to determine if said specific device controller supports the command, and if so, said first sequence invoking execution of a program within said specific device controller;

executing a third sequence of program steps on said other processor to receive information from said specific device controller indicating the state of the I/O operation and signal the state information to said first sequence; and using a multitasking operating system, controlling execution of said first sequence and said second sequence on said other processor in a common task, and said third sequence on said other processor in a different task.

17. A method as set forth in claim 16 wherein said specific device controller signals said third sequence as to completion of said I/O operation by an interrupt.

18. A method as set forth in claim 16 wherein said first sequence also determines if said specific device controller is available before invokinq execution of said second sequence.

19. A method as set forth in claim 16 wherein said specific device controller invokes said different task after said specific device controller completes said I/O operation.

20. A method as set forth in claim 16 further comprising the step of executing on said other processor a fourth sequence of program steps specific to a control command to set a status of said specific device controller to busy; and wherein said operating system controls execution of said fourth sequence on said other processor in said common task.

21. A method as set forth in claim 20 wherein the I/O state information indicates completion of the I/O operation and further comprising the steps of:

executing a fifth sequence of program steps on said other processor to reset the status of said specific device controller from busy to available in response to the completion signal from the third sequence; and wherein said operating system controls execution of said fifth sequence on said other processor in said common task.

22. A method as set forth in claim 16 further comprising the step of terminating said common task when said first sequence invokes execution of the program within said specific device controller.

23. A method as set forth in claim 16 wherein said third sequence also analyzes control information associated with the command while said specific device controller performs the I/O operation.

* * * * *